United States Patent Office 2,777,807
Patented Jan. 15, 1957

2,777,807

PROCESS OF SUPPRESSING FOAM FORMATION IN DISTILLATION OF ACRYLONITRILE

Cyrus Pyle and Gilbert Meredith Turner, New Castle, Del., assignors to E. I. du Pont de Nemours and Company, Wilmington, Del., a corporation of Delaware No Drawing. Application November 22, 1952, Serial No. 322,156

3 Claims. (Cl. 202—39.5)

This invention relates to the prevention of foaming in aqueous media. More particularly, it relates to the prevention of foaming in aqueous media that contain polar compounds.

Foaming occurs in aqueous solutions of many low molecular weight polar compounds, such as alcohols, acids, and amines. Maximum froth stability usually occurs at a fairly low concentration and over a narrow range. These factors have prevented the recognition that the foaming properties of such polar compounds can cause trouble in distillation and absorption apparatus through which the media are being processed. The zone of foaming is generally too limited to cause trouble.

However, in the extractive distillation of many aqueous media the change of concentration per plate is very slight. For example, in the extractive distillation of acrylonitrile with large concentrations of water, the change in acrylonitrile concentration per plate in the stripping zone is limited by the water rate. Sufficient foaming occurs to make distillation very difficult.

An object of this invention is the provision of a process for preventing foaming in aqueous media. A further object is the provision of a process for overcoming the foaming tendencies of polar compounds in aqueous media. A still further object is the provision of a process for the extractive distillation, without foaming, of aqueous media containing polar compounds.

The objects of this invention are accomplished by placing tricresyl phosphate in the aqueous media containing the foaming agent. Tricresyl phosphate (TCP) is an effective antifoamant in concentrations of 5 p. p. m. or more, preferably 10 p. p. m. Larger concentrations can, of course, be used, but are less economical. There is no fully satisfactory explanation of the physical factors that cause bubbles to be stable and form foam under some conditions. One cannot, therefore, predict a process for preventing foaming. Of the many compounds tested, including materials structurally related to tricresyl phosphate, only tricresyl phosphate was found to be satisfactorily effective. The examples and discussion given below, for illustrative and not limitative purposes, describe this invention in more detail.

EXAMPLE I

Air was passed through 200 parts of an aqueous solution at room temperature and containing a polar compound which causes foaming in such media. Foam volumes (in cc.) were measured for the given solution and for water alone. The difference was divided by the air rate (in cc./sec.) to give the relative foam stability (R. F. S.), in seconds. This is a measure of the increase in bubble lifetime caused by the foamer. It is practically independent of the air rate and of the amount of liquid and depends chiefly on the nature and concentration of the foamer and, of course, of the antifoamant when it is present. The foam stabilities in the absence and in the presence of tricresyl phosphate are compared in Table I below.

Table 1

| Foamer in Solution | R. F. S. | |
|---|---|---|
| | No TCP | TCP |
| Acetic Acid | 0.8 | 0.2 |
| Dimethyl formamide | 0.5 | 0.2 |
| Ethyl acetate | 0.3 | 0.1 |
| Aceteldehyde | 0.4 | 0.2 |

This illustrates how tricresyl phosphate effectively reduces the foaming. The modified aqueous solutions can be handled with ease; the foaming is either eliminated or modified to such an extent that no appreciable difficulty is encountered in such processes as distillation. In the distillation of ethanol with water marked foaming occurred in the absence of tricresyl phosphate and there was essentially no foaming in its presence.

Aqueous solutions of many polar compounds can be similarly modified with tricresyl phosphate to prevent foaming. Included among these compounds are the following: Acetone, acetonitrile, acrolein, acrylonitrile, allyl alcohol, amyl alcohol, amyl amine, butyl acetate, butyl alcohol, butyl amine, butyl formate, butyraldehyde, butyric acid, chloral, crotonaldehyde, cyclohexanone, cyclohexamine, diacetone alcohol, diethyl ketone, ethyl amine, ethyl formate, ethyl lactate, ethylene chlorhydrin, ethylene diamine, ethylene glycol, formic acid, furfural, furfuryl alcohol, mesityl oxide, methyl acetate, methyl alcohol, methyl amine, methyl ethyl ketone, methyl formate, methyl propionate, paraldehyde, picoline, pinacoline, piperidine, propionic acid, propionitrile, propionaldehyde, propyl acetate, propyl alcohol, propyl amine, propyl formate, propylene chlorhydrin, pyrazoline, pyridine, pyrrolidine, pyrroline, and thioacetic acid.

EXAMPLE II

In the commercial production of polyacrylonitrile and its copolymers, extractive distillation is employed in the recovery of acrylonitrile from polymerization systems. Large quantities of water are used to purify recovered acrylonitrile. In this process impure acrylonitrile is fed into a fractionating column and water is introduced near the top of the column to provide 95 mol percent of water on most of the plates in the column. Acrylonitrile and water are removed at the top of the column; the acrylonitrile forms the top layer in the condensate and is readily separated from the water below it. The rest of the water issues from the bottom of the column and carries with it the impurities which are to be removed, such as acetonitrile. The process is described and claimed in the copending application of Kemp, Pyle and Turner, U. S. Serial No. 270,212, filed on February 6, 1952, now Patent No. 2,681,306.

In this process foaming occasionally occurs at one place in the column when the particular concentration of acrylonitrile happens to be low and in the range in which maximum froth stability is achieved. This usually is in regions where there is not enough acrylonitrile in the water to form two liquid phases. The temperature in the column in the region where maximum foaming occurs without tricresyl phosphate is about 85° C.

When foaming occurred, the liquid in the foam would be held up for a period of time and then would suddenly "break" and rush down the column. Valuable acrylonitrile would be lost in the bottoms. Attempts to avoid this by temperature control were ineffective. A large number of possible antifoamants, forty or more, were tried and found to be unsuccessful, including tributyl phosphate. Addition of a few parts per million of tricresyl phosphate eliminated the foaming and distillation occurred in a smooth uninterrupted manner without any foaming. Tricresyl phosphate was, surprisingly, an efficient antifoamant. It is further surprising that tricresyl phosphate effectively eliminates foaming caused by polar compounds when it is realized that this agent is itself a polar compound.

Similar distillations of an aqueous medium containing acetone and high water concentrations were accomplished without foaming by adding tricresyl phosphate to the medium to be distilled. Likewise, the foaming tendencies of ethanol, propanol and cyclohexyl amine were controlled or eliminated in distillations of similar aqueous media containing them through the use of tricresyl phosphate.

The tricresyl phosphate is effective in similar operations in which foaming is caused by materials other than acrylonitrile. The materials mentioned in Example I, for instance, can be rendered harmless as foamers by adding tricresyl phosphate to their aqueous solutions.

EXAMPLE III

In the manufacture of polyacrylonitrile fibers, dimethyl formamide vapors are recovered from an air stream by scrubbing with water in a bubble-cap absorption tower. Under certain conditions of operation, the capacity of this absorption tower may be markedly reduced by foaming of the aqueous dimethyl formamide solution in the tower. Addition of about 10 p. p. m. of tricresyl phosphate to the scrubbing water effectively eliminates the tendency to foam and thereby increases the capacity of the tower. The recovered dimethyl formamide is readily freed of tricresyl phosphate by distillation.

The amount of tricresyl phosphate needed to prevent foaming will depend to some extent on the nature of the media, the degree of foaming and similar factors. In most cases no more than 10 p. p. m. will be needed and in many instances less is required. For example, 5 p. p. m. are effective. The amount added to the aqueous media will, of course, be adjusted, either upwardly or downwardly, from 10 p. p. m. as needed. The amount is generally 5 p. p. m. or more. The effectiveness of this material allows for control at a very low cost.

By the process of this invention production costs are lowered, because shut-downs are eliminated and because valuable materials to be recovered are not lost through uncontrolled foaming. Production capacity of such systems as distillation and scrubber systems is increased without added equipment costs and within added pressure or temperature changes.

Any departure from the above description which conforms to the present invention is intended to be included within the scope of the claims.

We claim:

1. In a continuous process for distilling acrylonitrile and water mixtures in a fractionating column in which acrylonitrile and water are fed into the column near the top, the improvement of suppressing the formation of foam in the system which comprises adding near the top of the column at least five parts per million of a foam suppressant consisting of tricresyl phosphate based on the combined acrylonitrile and water fed into the top of the system.

2. The process of claim 1 in which about 10 parts per million of tricresyl phosphate are added.

3. The process of claim 1 in which the temperature in the column is maintained at about 85° C.

References Cited in the file of this patent

UNITED STATES PATENTS

| | | |
|---|---|---|
| 2,219,050 | Mikoska | Oct. 22, 1940 |
| 2,298,465 | Clapsadle | Oct. 13, 1942 |
| 2,328,551 | Gunderson | Sept. 7, 1943 |

FOREIGN PATENTS

| | | |
|---|---|---|
| 456,049 | Great Britain | Jan. 26, 1935 |
| 651,307 | Great Britain | Mar. 14, 1951 |